H. DOTZER.
OIL CLUTCH AND SPEED REGULATOR.
APPLICATION FILED DEC. 31, 1908.
923,956.
Patented June 8, 1909.
2 SHEETS—SHEET 2.
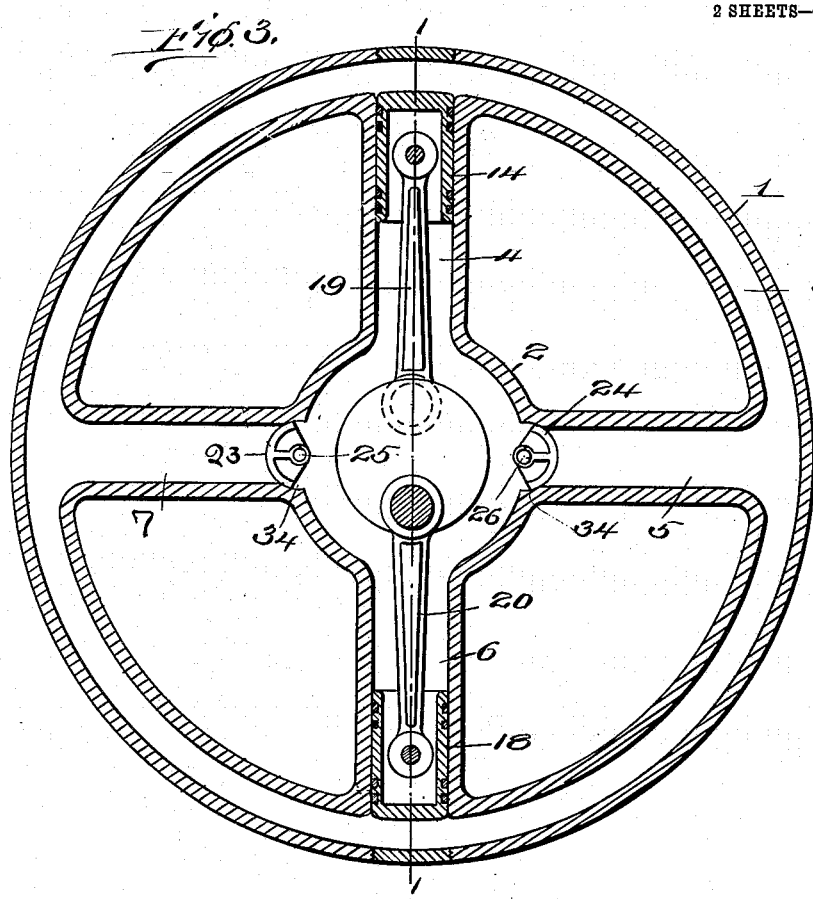
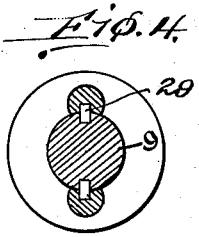
Witnesses
Inventor
Hugo Dotzer
By Mason Fenwick Lawrence
Attorneys

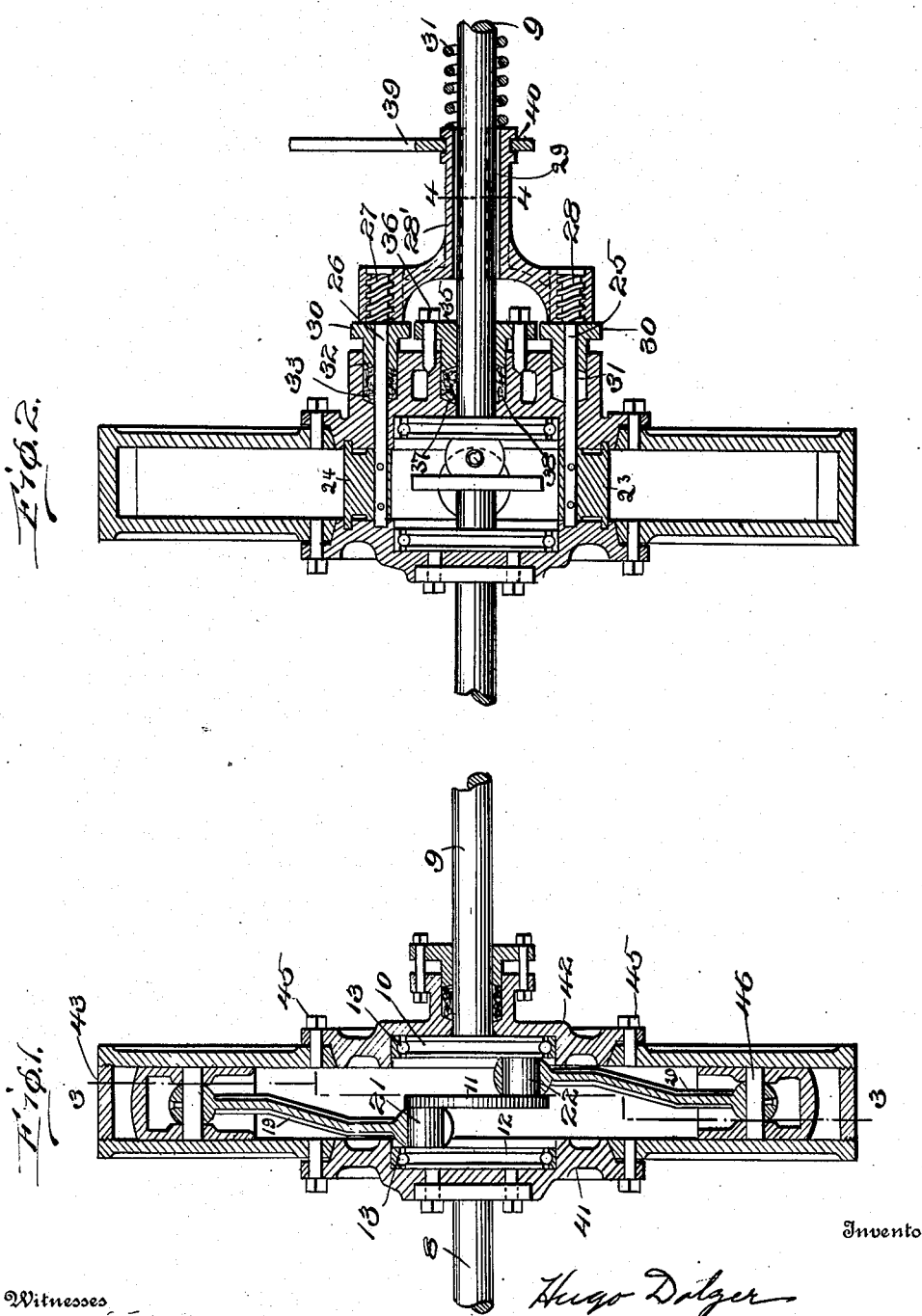

UNITED STATES PATENT OFFICE.

HUGO DOTZER, OF SEATTLE, WASHINGTON.

OIL-CLUTCH AND SPEED-REGULATOR.

No. 923,956.　　　　　Specification of Letters Patent.　　　Patented June 8, 1909.

Application filed December 31, 1908. Serial No. 470,182.

*To all whom it may concern:*

Be it known that I, HUGO DOTZER, citizen of Germany, residing at Seattle, in the county of King and State of Washington, have invented certain new and useful Improvements in Oil-Clutches and Speed-Regulators; and I do hereby declare the following to be a full, clear, and exact description of the invention, such as will enable others skilled in the art to which it appertains to make and use the same.

This invention relates to clutches and speed regulators, and more particularly to clutches arranged for attachment to the crank shaft of an automobile for transmitting power to the shaft connected with the differential, and for controlling the speed of the shaft last mentioned.

The object of the invention is to provide a device which will efficiently perform its functions as a clutch, and which will at the same time permit of the regulation of the transmission in every stage from zero to the maximum.

A further object is the provision of a device permitting such regulation of the speed without causing any strain on the mechanism such as is occasioned in certain types of clutches by the operation of changing from low to high speed.

In the accompanying drawings: Figure 1 is a cross section of a clutch, the section being taken on the line 1—1 of Fig. 3. Fig. 2 is also a cross section but on a line at right angles to the section shown in Fig. 1. Fig. 3 is a section on the line 3—3 of Fig. 1. Fig. 4 is a section on the line 4—4 of Fig. 2.

Referring to the drawings in detail, 1 indicates a fly wheel formed with chambers the walls of which constitute the housing of the clutch mechanism, 2 indicates the crank housing, and 3 an annular chamber formed within the walls of the rim of the wheel, and having connection by means of channels 4, 5, 6 and 7 with crank casing 2. The engine shaft 8 is rigidly connected with the housing and transmits power to the shaft 9 leading to the differential. A disk 10 is carried by shaft 9, such disk carrying in turn a crank disk 11 connected to another disk 12 located within a recess in the opposite side of the housing. Disks 10 and 12 are provided with ball bearings, as shown at 13.

Channels 4 and 6 serve the purpose of cylinders, and within these channels the pistons 14 and 18 operate. The pistons are connected by means of rods 19 and 20 with crank pins 21 and 22 carried by the disks 10, 11 and 12.

Channels 5 and 7 are closed at the point of their connection with the crank housing 2 by means of valves 23 and 24 carried by valve stems 25 and 26, the latter being provided with worms 27 and 28 engaging threads formed on sliding collar 28'. This collar is keyed to the transmission shaft 9 by means of keys 29, and is normally held in contact with collars 30 by means of a spring 31 encircling shaft 9. Collars 30, formed in the manner shown, surround the valve stems, and the reduced portion 32 of these collars enters the openings 33 within the housing and bears against a suitable packing material. The valves 23 and 24 are substantially semi-cylindrical in form and are seated at the inner opening of channels 7 and 5 respectively, having their bearings at the points 34.

A collar 35 on shaft 9 is provided with adjusting screws or bolts 36 and bears against a packing 37 located within a recess 38 in the housing.

A lever 39 engages an annular recess 40 formed on the sliding collar 28', and has connection at the other end with the speed lever. It will be understood that the operation of throwing collar 28' toward or away from the housing of the clutch will have the effect of operating valve stems 25 and 26 carrying valves 23 and 24.

Chambers 2 and 3, and channels 4, 5, 6 and 7 are filled with oil, and when the valves 23 and 24 are open the oil will be freely circulated through these chambers and channels by means of pistons 14 and 18. When the valves are partly closed the circulation will of course be retarded to a degree corresponding to the position of such valves. If the valves are entirely closed by the operation of lever 39, circulation will be wholly discontinued and the pistons 14 and 18 will have substantially no movement. Under these conditions the shaft 9 must rotate with shaft 8 and at the same speed.

In the construction of the fly wheel, which constitutes in fact the housing of the clutch mechanism, I may make use of hub members 41 and 42, secured to the wheel proper by means of bolts 45. The particular construction of the clutch housing is of course immaterial so far as the spirit of my invention is concerned.

The pistons 14 and 18 are shown as being formed of tubular members having a central pivot 46 mounted therein, to which pivots connecting rods 19 and 20 are attached.

What I claim is:

1. In a clutch, a housing provided with a plurality of chambers, channels connecting the chambers, such channels and chambers adapted to contain a fluid, a shaft secured to the housing, a second shaft having its bearing in such housing, pistons arranged to operate in and close some of the channels, each of such pistons arranged to force fluid through the remaining channels from the outer to the inner chamber upon the stroke of such piston in one direction and to force the fluid in a reverse direction upon the opposite stroke and means for connecting such pistons with the second shaft.

2. In a clutch, a housing provided with a plurality of concentric chambers, channels connecting the chambers, such channels and chambers adapted to contain a fluid, a shaft secured to the housing, a second shaft having its bearing in such housing, pistons arranged to operate in and close some of the channels valves controlling the remaining channels, each of such pistons arranged to force fluid through the remaining channels from the outer to the inner chamber upon the stroke of such piston in one direction and to force the fluid in a reverse direction upon the opposite stroke and means for connecting such pistons with the second shaft.

3. In a clutch, a housing provided with a plurality of concentric chambers, adapted to contain a fluid, channels connecting such chambers, pistons operated in some of the channels, valves controlling the remaining channels, an engine shaft connected with the housing, a second shaft having its bearing in the housing, and means for connecting the pistons with such second shaft.

4. In a clutch, a housing provided with a plurality of chambers, adapted to contain a fluid, channels connecting such chambers, pistons operating in and closing some of the channels, and arranged to increase the amount of fluid in the outer chamber and the unobstructed portions of the channels connected therewith and simultaneously decrease that in the inner chamber and the unobstructed portions of the channels connected therewith valves controlling the channels other than those provided with pistons, an engine shaft connected with the housing, a second shaft having its bearing in the housing, and means connecting the pistons with such second shaft.

5. In a clutch, a housing provided with an outer chamber, an inner chamber the walls of which are provided with bearings, a shaft connected with the housing, a crank mechanism, a second shaft having a bearing within the housing and connected with the crank mechanism, such mechanism contacting with the bearings first mentioned, channels connecting the inner and outer chambers, such chambers adapted to contain fluid, valves for closing some of the channels, and devices operating within the remaining channels and connected with the crank mechanism.

6. In a clutch, a housing provided with an outer chamber, an inner chamber the walls of which are provided with bearings, a shaft connected with the housing, a crank mechanism, a second shaft having a bearing within the housing and connected with the crank mechanism, such mechanism contacting with the bearings first mentioned, channels connecting the inner and outer chambers, such chambers adapted to contain fluid, valves for closing some of the channels, devices operating within the remaining channels and connected with the crank mechanism, stems for the valves, and worms for operating the valve stems.

7. In a clutch, a housing, a shaft connected therewith, a second shaft having its bearing within the housing, a series of disks secured to the shaft last mentioned, pistons connected with the disks, such pistons operating in channels formed in the housing and connected at either end with chambers in such housing, additional channels connecting the chambers of the housing, and valves for closing such additional channels.

8. In a clutch, a housing having a plurality of chambers, adapted to contain a fluid, such housing provided with recesses having bearings therein, a shaft connected with the housing, a second shaft having its bearing therein, a disk connected with the second shaft, a second disk connected with the disk first mentioned, such disks mounted in the bearings in said recesses of the housing, pistons pivotally connected with the disks, such pistons operating in channels connecting the chambers, valves controlling additional channels connecting such chambers, a collar carried by the second shaft, means for reciprocating such collar, and means for operating the valves when the collar is reciprocated.

9. In a clutch, a housing, a shaft connected therewith, a second shaft having its bearing in the housing, means whereby power is transmitted from the housing to the second shaft such means comprising a plurality of chambers, channels connecting such chambers, and devices operating in and closing some of the channels and arranged to force a fluid from one chamber to the other through the remaining channels at every stroke of such devices, valves operating in connection with such means, a reciprocating collar carried by the second shaft, worms operated by the collar, stems for the valves, such worms being carried by the valve stems.

10. In a clutch, a housing, a shaft connected therewith, a second shaft having its bearing in the housing, a plurality of disks rigidly connected with the second shaft, having their bearings in the housing means operating in the housing for driving the disks and the shaft connected therewith, valves operating in connection with such means, stems for the valves, a collar carried by the second shaft, worms operated by the collar, such worms being connected with the valve stems.

11. In a clutch, a housing provided with an outer chamber, an inner chamber inclosing a portion of the clutch mechanism, such chambers adapted to contain fluid, channels connecting the chambers, pistons operating in the channels, additional channels connecting the chambers, valves controlling such channels, a plurality of disks carried by the second shaft, rods connecting the pistons with the disks, bearings within the housing for suporting some of said disks, a sliding collar carried by the second shaft, a spring contacting with the collar, a lever for operating the collar, worms operated by threads formed in the collar, stems for the valves, such worms being mounted on the valve stems.

12. In a clutch, a housing, a shaft connected therewith, a second shaft having its bearing in the housing, a series of disks secured to the second shaft, such disks being formed with grooves on their periphery, ball bearings in the housing engaging such grooves, and means connected with the disks whereby power is transmitted from the first shaft through the housing to the second shaft.

13. In a clutch, a housing, a plurality of chambers therein, channels connecting the chambers, pistons operating in some of the channels, valves controlling the remaining channels, a shaft secured to the housing, a second shaft loosely mounted therein, a plurality of disks carried by the second shaft, such disks being provided with grooves in their peripheries, ball bearings in the housing contacting with the grooves in the disks, means for connecting the disks with the pistons, and means for controlling the valves.

14. In a clutch, a housing, a plurality of chambers therein, channels connecting the chambers, pistons operating in some of the channels, valves controlling the remaining channels, stems for the valves a shaft secured to the housing, a second shaft loosely mounted therein, a plurality of disks carried by the second shaft, such disks being provided with grooves in their peripheries, ball bearings in the housing contacting with the grooves in the disk, means for connecting the disks with the pistons, and means comprising a sliding collar and worms on the valve stems operated by the collar for controlling the valves.

15. In a clutch, a housing, a plurality of chambers therein, channels connecting the chambers, pistons operating in some of the channels, valves controlling the remaining channels, a shaft secured to the housing, a second shaft loosely mounted therein, a plurality of disks carried by the second shaft, such disks being provided with grooves in their peripheries, ball bearings in the housing contacting with the grooves in the disks means for connecting the disks with the pistons, means comprising a sliding collar and worms on the valve stems operated by the collar for controlling the valves, a spring bearing against said collar, and a lever for operating the collar.

In testimony whereof I affix my signature in presence of two witnesses.

HUGO DOTZER.

Witnesses:
G. WARD KEMP,
C. C. PHILLIPS.